(12) United States Patent
Zhou et al.

(10) Patent No.: US 11,736,342 B2
(45) Date of Patent: Aug. 22, 2023

(54) DIFFERENT BEAM FAILURE INDICATORS FOR NOISE OR INTERFERENCE

(71) Applicant: QUALCOMM Incorporated, San Diego, CA (US)

(72) Inventors: Shanyu Zhou, San Diego, CA (US); Jelena Damnjanovic, Del Mar, CA (US); Junyi Li, Franklin Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 17/219,668

(22) Filed: Mar. 31, 2021

(65) Prior Publication Data

US 2022/0321402 A1    Oct. 6, 2022

(51) Int. Cl.
*H04L 5/00*      (2006.01)
*H04W 24/08*     (2009.01)
*H04L 41/0677*   (2022.01)
*H04L 43/16*     (2022.01)
*H04L 41/0654*   (2022.01)

(52) U.S. Cl.
CPC ........ *H04L 41/0677* (2013.01); *H04L 5/0048* (2013.01); *H04L 41/0654* (2013.01); *H04L 43/16* (2013.01); *H04W 24/08* (2013.01)

(58) Field of Classification Search
CPC . H04L 41/0654; H04L 41/0677; H04L 43/16; H04L 5/0048; H04W 24/08; H04W 24/10
See application file for complete search history.

(56) References Cited

U.S. PATENT DOCUMENTS

2019/0245737 A1 * 8/2019 Zhou ..................... H04B 7/088

* cited by examiner

*Primary Examiner* — Melvin C Marcelo
*Assistant Examiner* — Natali Pascual Peguero
(74) *Attorney, Agent, or Firm* — Arun Swain; Harrity & Harrity, LLP

(57) ABSTRACT

Various aspects of the present disclosure generally relate to wireless communication. In some aspects, a user equipment (UE) may receive, from a base station, at least one reference signal associated with at least one beam. The UE may generate a beam failure indicator (BFI) based at least in part on one or more measurements of the at least one reference signal at the UE. The BFI may be selected (e.g., by the UE or by the base station) from two or more types of BFI based at least in part on one or more measurements associated with the at least one beam at the base station. Numerous other aspects are described.

30 Claims, 11 Drawing Sheets

DIFFERENT BEAM FAILURE INDICATORS FOR NOISE OR INTERFERENCE

FIELD OF THE DISCLOSURE

Aspects of the present disclosure generally relate to wireless communication and to techniques and apparatuses for generating different beam failure indicators for noise or for interference.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the memory and the one or more processors configured to receive, from a base station, at least one reference signal associated with at least one beam; and generate a beam failure indicator (BFI) based at least in part on one or more measurements of the at least one reference signal at the UE, wherein the BFI is selected from two or more types of BFI based at least in part on one or more measurements associated with the at least one beam at the base station.

In some aspects, a base station for wireless communication includes a memory and one or more processors coupled to the memory, the memory and the one or more processors configured to transmit, to a UE, at least one reference signal associated with at least one beam; and measure at least one signal from the UE based at least in part on a BFI generated by the UE.

In some aspects, a method of wireless communication performed by a UE includes receiving, from a base station, at least one reference signal associated with at least one beam; and generating a BFI based at least in part on one or more measurements of the at least one reference signal at the UE, wherein the BFI is selected from two or more types of BFI based at least in part on one or more measurements associated with the at least one beam at the base station.

In some aspects, a method of wireless communication performed by a base station includes transmitting, to a UE, at least one reference signal associated with at least one beam; and measuring at least one signal from the UE based at least in part on a BFI generated by the UE.

In some aspects, a non-transitory computer-readable medium storing a set of instructions for wireless communication includes one or more instructions that, when executed by one or more processors of a UE, cause the UE to receive, from a base station, at least one reference signal associated with at least one beam; and generate a BFI based at least in part on one or more measurements of the at least one reference signal at the UE, wherein the BFI is selected from two or more types of BFI based at least in part on one or more measurements associated with the at least one beam at the base station.

In some aspects, a non-transitory computer-readable medium storing a set of instructions for wireless communication includes one or more instructions that, when executed by one or more processors of a base station, cause the base station to transmit, to a UE, at least one reference signal associated with at least one beam; and measure at least one signal from the UE based at least in part on a BFI generated by the UE.

In some aspects, an apparatus for wireless communication includes means for receiving, from a base station, at least one reference signal associated with at least one beam; and means for generating a BFI based at least in part on one or more measurements of the at least one reference signal at the apparatus, wherein the BFI is selected from two or more types of BFI based at least in part on one or more measurements associated with the at least one beam at the base station.

In some aspects, an apparatus for wireless communication includes means for transmitting, to a UE, at least one reference signal associated with at least one beam; and means for measuring at least one signal from the UE based at least in part on a BFI generated by the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
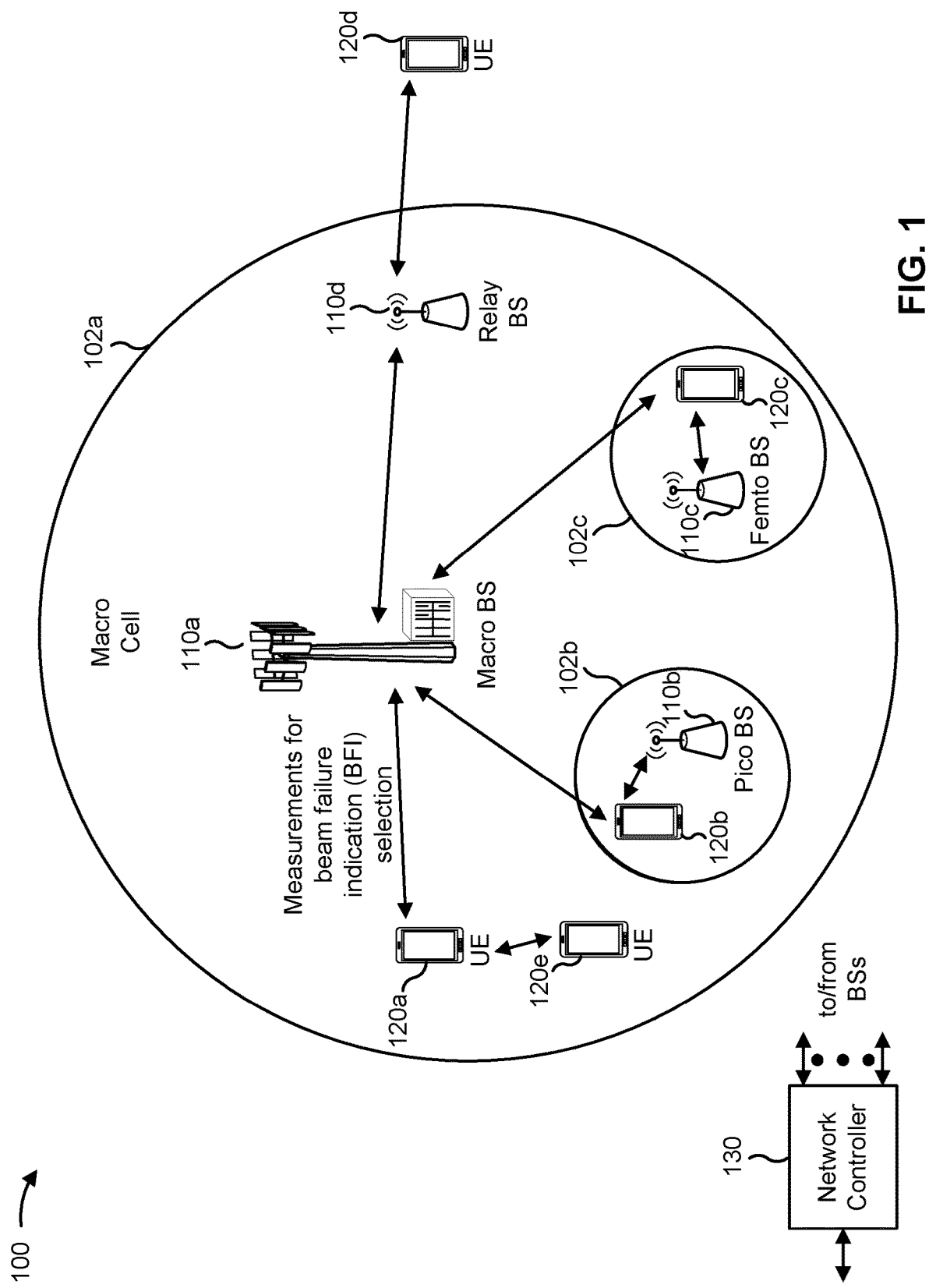
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

As further shown in FIG. 1, the UE 120a and the base station 110 may exchange measurements such that the UE 120a may distinguish different types of BFI (e.g., as described below in connection with FIGS. 5-7). For example, the UE 120a may measure reference signals (e.g., channel state information (CSI) reference signals (CSI-RSs), synchronization signal blocks (SSBs), and/or other reference signals) from the base station 110, and the base station 110 may measure reference signals (e.g. demodulation reference signals (DMRSs), sounding reference signals (SRSs), and/or other reference signals) from the UE 120a. Accordingly, the UE 120a may select between different types of BFI based at least in part on the measurement(s) performed by the UE 120a and the measurement(s) performed by the base station 110. As an alternative, the base station 110 may select between different types of BFI, based at least in part on the measurement(s) performed by the UE 120a and the measurement(s) performed by the base station 110, and inform the UE 120a of the selection.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
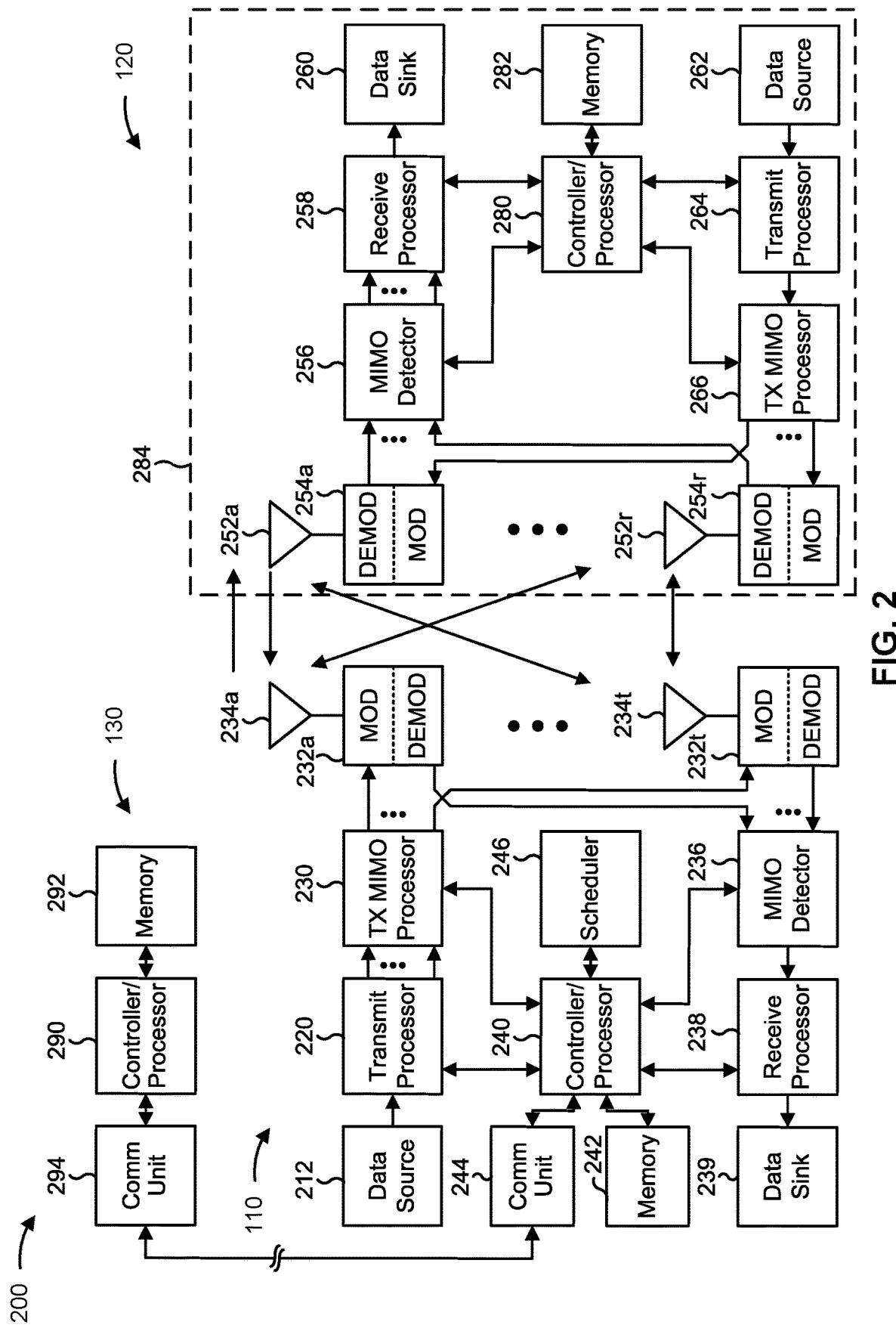
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282) to perform aspects of any of the methods described herein (for example, with reference to FIGS. 6-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 6-9).

Controller/processor 240 of base station 110, controller/processor 280 of UE 120, and/or any other component(s) of FIG. 2 may perform one or more techniques associated with generating different BFIs for noise or for interference, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a UE (e.g., the UE 120 and/or apparatus 1000 of FIG. 10) may include means for receiving, from a base station (e.g., the base station 110 and/or apparatus 1100 of FIG. 11), at least one reference signal associated with at least one beam; or means for generating a BFI based at least in part on one or more measurements of the at least one reference signal at the UE, wherein the BFI is selected from two or more types of BFI based at least in part on one or more measurements associated with the at least one beam at the base station. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a base station (e.g., the base station 110 and/or apparatus 1100 of FIG. 11) may include means for transmitting, to a UE (e.g., the UE 120 and/or apparatus 1000 of FIG. 10), at least one reference signal associated with at least one beam; or means for measuring at least one signal from the UE based at least in part on a BFI generated by the UE. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
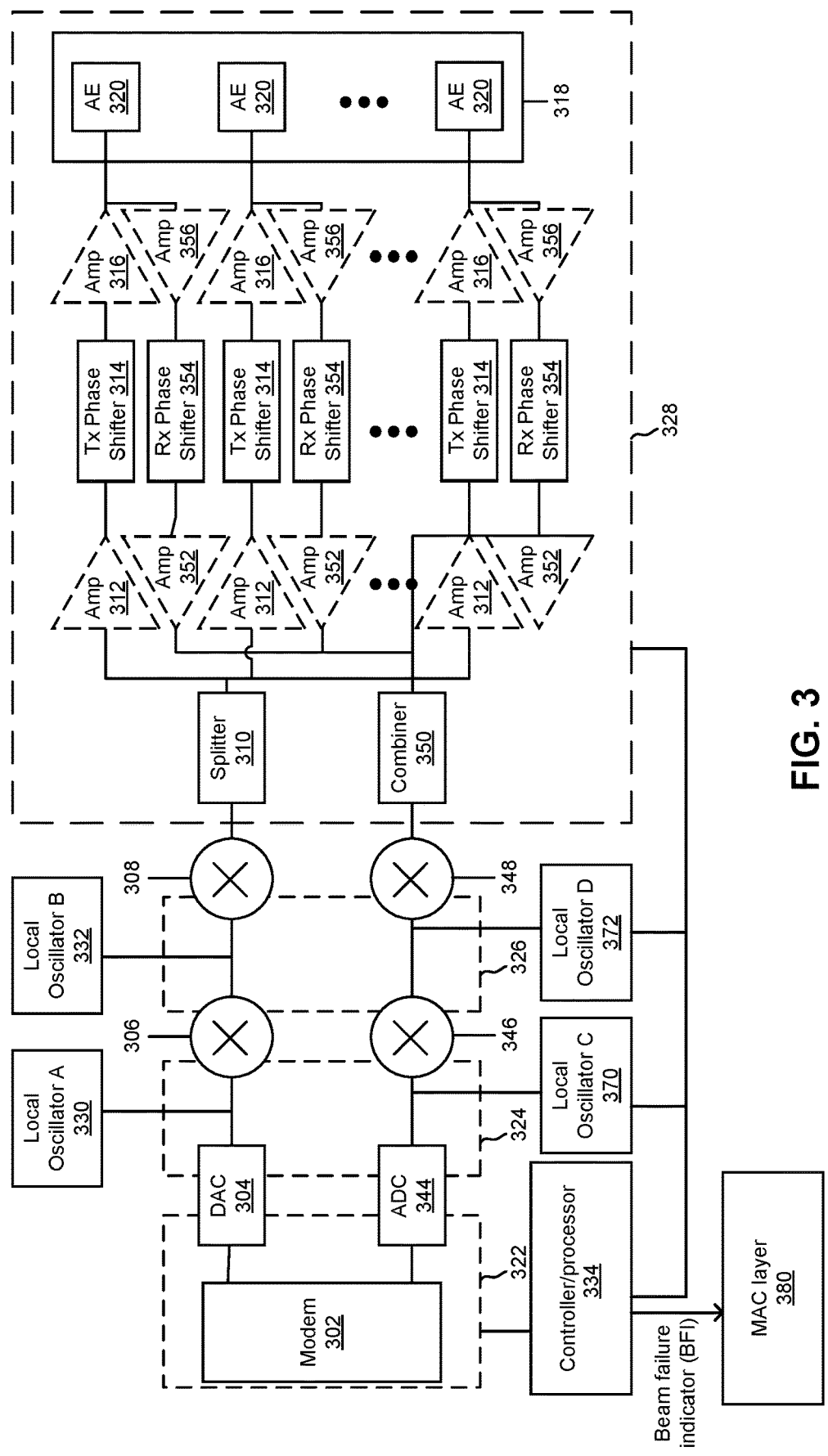
FIG. 3 is a diagram illustrating an example of beamforming architecture that supports beamforming for millimeter wave (mmW) communications, in accordance with the present disclosure.

FIG. 3 is a diagram illustrating an example beamforming architecture 300 that supports beamforming for mmW communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306 and 308, respectively, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312 and 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312 and 316, respectively, are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312 and 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312 and 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312 and 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352 and 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, and 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312 and 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first amplifier 312 and/or the second amplifier 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312 and 316 of the multiple signals relative to each other. The controller/processor 334 may be located partially or fully within one or more other components of the architecture 300. For example, the controller/processor 334 may be located within the modem 302 in some aspects.

As further shown in FIG. 3, a higher layer, such as medium access control (MAC) layer 380, may receive a BFI (e.g., as described below in connection with FIGS. 6-7) from the controller/processor 334. Accordingly, the MAC layer 380 may perform beam failure recovery (BFR) based at least in part on the BFI. For example, the architecture 300 may be included in a UE (e.g., UE 120 of FIGS. 1-2) such that the MAC layer 380 may perform BFR with a base station (e.g., base station 110 of FIGS. 1-2) in communication with the UE 120. The BFR may be performed according to 3GPP specifications and/or another standard. In some aspects described herein, the MAC layer 380 may perform BFR differently based at least in part on the type of BFI received from the controller/processor 334.

As indicated above, FIG. 3 is provided as an example. Other examples may differ from what is described with regard to FIG. 3.

Figure 4:
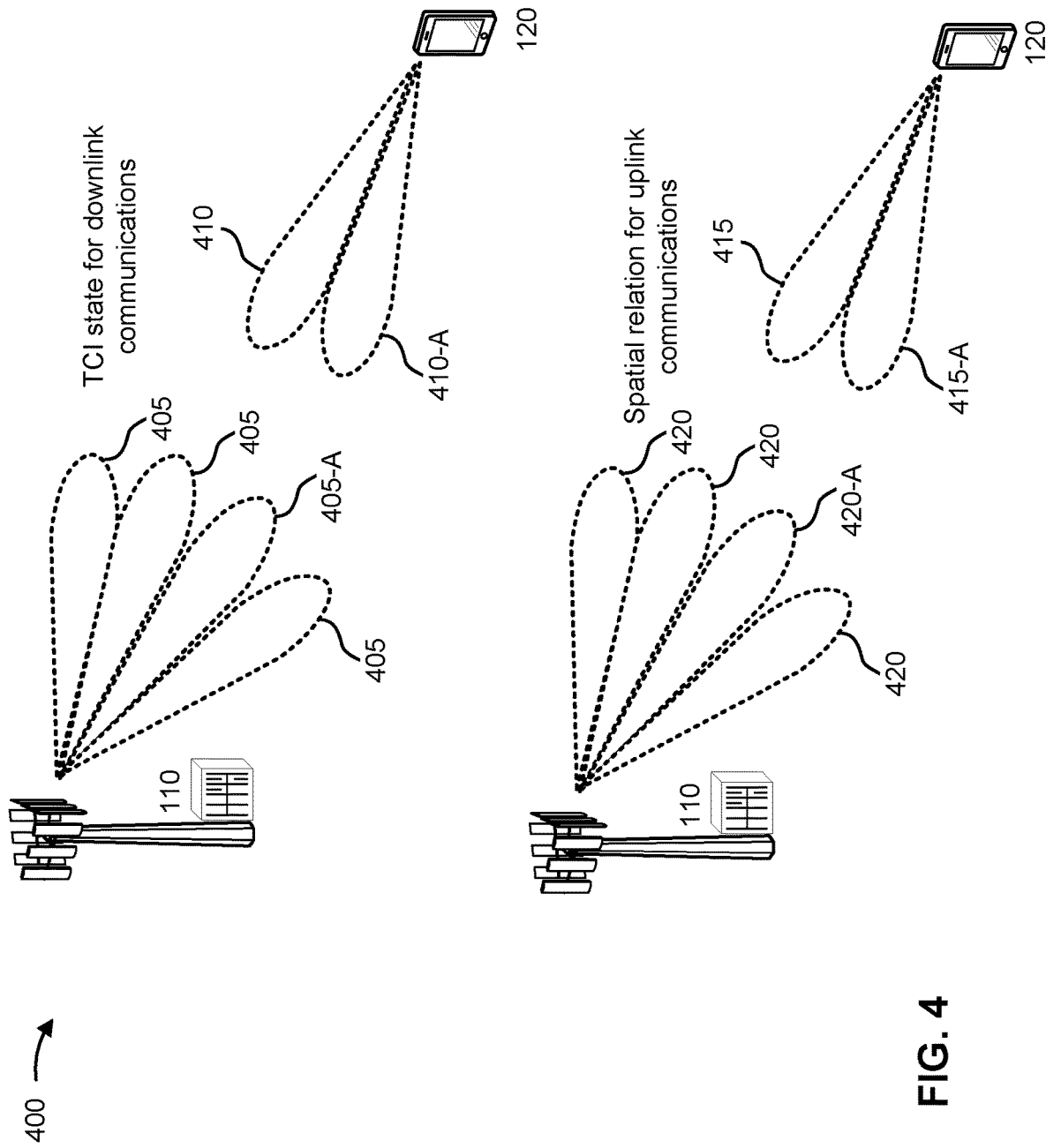
FIG. 4 is a diagram illustrating an example of using beams for communications between a base station and a UE, in accordance with the present disclosure.

FIG. 4 is a diagram illustrating an example 400 of using beams for communications between a base station and a UE, in accordance with the present disclosure. As shown in FIG. 4, a base station 110 and a UE 120 may communicate with one another.

The base station 110 may transmit to UEs located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 405-A and the UE receive beam 410-A), which may be further refined and maintained in accordance with one or more established beam refinement procedures (e.g., as described below in connection with FIG. 5).

A downlink beam, such as a BS transmit beam 405 or a UE receive beam 410, may be associated with a transmission configuration indication (TCI) state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 405 may be associated with a synchronization signal block (SSB), and the UE 120 may indicate a preferred BS transmit beam 405 by transmitting uplink transmissions in resources of the SSB that are associated with the preferred BS transmit beam 405. A particular SSB may have an associated TCI state (for example, for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

As indicated above, FIG. 4 is provided as an example. Other examples may differ from what is described with respect to FIG. 4.

Figure 5:
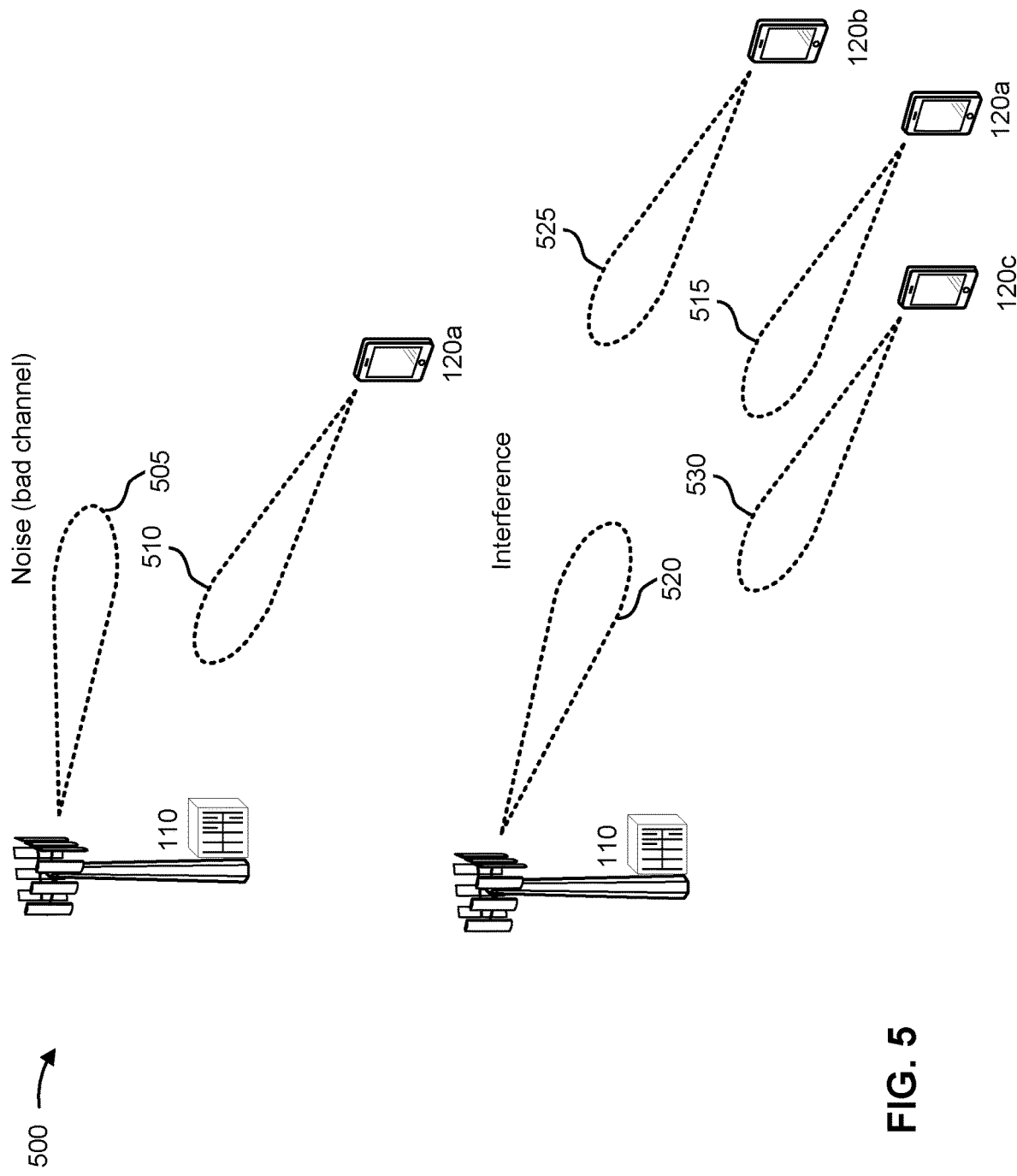
FIG. 5 is a diagram illustrating an example of beam-related noise and an example of beam-related interference, in accordance with the present disclosure.

FIG. 5 is a diagram illustrating an example 500 of beam-related noise and as compared with beam-related interference, in accordance with the present disclosure. As shown in FIG. 5, a base station 110 and a UE 120a may communicate with one another.

In example 500, the base station 110 may transmit to the UE 120a using a beam 505, which may be configured using different beamforming parameters at transmit circuitry of the base station 110 (e.g., as described above in connection with FIG. 3). Similarly, the UE 120a may receive from the base station 110 via a receive beam 510 (also referred to as a "reception filter"), which may be configured using different beamforming parameters at receive circuitry of the UE 120a (e.g., as described above in connection with FIG. 3). However, the beam 505 and/or the beam 510 may result in a bad channel between the base station 110 and the UE 120a. For example, the UE 120*a* may have moved into an environment with lots of noise, obstructions, and/or other environmental factors that reduce quality and/or reliability of communications using the beam 505 and/or the beam 510. Thus, the UE 120*a* and the base station 110 may both experience poor communication quality and/or reliability.

On the other hand, and as further shown in FIG. 5, the base station 110 may transmit to the UE 120*a* using a beam 520, which may be configured using different beamforming parameters at transmit circuitry of the base station 110 (e.g., as described above in connection with FIG. 3). Similarly, the UE 120*a* may receive from the base station 110 via a receive beam 515 (also referred to as a "reception filter"), which may be configured using different beamforming parameters at receive circuitry of the UE 120*a* (e.g., as described above in connection with FIG. 3). However, the UE 120*a* may experience interference from other devices near UE 120*a* (e.g., interference from beam 525 used by UE 120*b* and interference from beam 530 used by UE 120*c*, in example 500). Accordingly, the UE 120*a* may experience reduced quality and/or reliability of communications. However, the base station 110 will not experience degradation from the interference, which is local to the UE 120*a*; accordingly, only the UE 120*a* may experience poor communication quality and/or reliability.

In some situations, a lower layer of a UE (e.g., a physical (PHY) layer) may generate a BFI when an indicator of communication quality, communication reliability, and/or signal strength (e.g., signal-to-interference-and-noise ratio (SINR), block error rate (BLER), and/or another similar measure), associated with a base station, satisfies a threshold (e.g., as defined in 3GPP specifications and/or another standard). Accordingly, a higher layer of the UE (e.g., a MAC layer) may perform BFR (e.g., according to 3GPP specifications and/or another standard) after receiving a threshold quantity of BFIs. For example, BFR may include selecting a different beam to use in communicating with the base station. However, this may include re-establishing an RRC connection, a random access channel (RACH), and/or other channels between the UE and the base station, which generally consumes a lot of processing resources, network overhead, and battery power.

Some techniques and apparatuses described herein enable a UE (e.g., UE 120) to distinguish between different types of BFI. For example, the UE 120 may distinguish BFI that is a result of noise from BFI that is result of interference (e.g., as described above in connection with FIG. 5). The UE 120 may select a type of BFI based at least in part on measurements received from a base station (e.g., base station 110), or the base station 110 may select the type of BFI based at least in part on measurements received from the UE 120. Accordingly, the UE 120 may use one threshold, associated with a quantity of received BFIs, to trigger BFR for one type of BFI but a different threshold to trigger BFR for a different type of BFI. For example, the UE 120 may use a higher threshold to trigger BFR for BFIs associated with interference, as compared with BFIs associated with noise, because local interference is more likely to be temporary. Additionally, or alternatively, the UE 120 may use one BFR procedure based at least in part on one type of BFI, but a different BFR procedure based at least in part on a different type of BFI. For example, the UE 120 may adjust an MCS scheme, a transmit power, and/or another property of transmissions when detecting BFI associated with interference, rather than selecting a different beam to use in communicating with the base station 110 as is performed when detecting BFI associated with noise, because interference affects the UE 120 locally while noise affects the whole channel between the UE 120 and the base station 110. As a result, the UE 120 conserves network overhead, processing resources, and battery power by reducing a likelihood of re-establishing an RRC connection, a RACH, and/or other channels between the UE 120 and the base station 110 when local interference is causing a temporary reduction in communication quality, communication reliability, and/or signal strength.

As indicated above, FIG. 5 is provided as an example. Other examples may differ from what is described with respect to FIG. 5.

Figure 6:
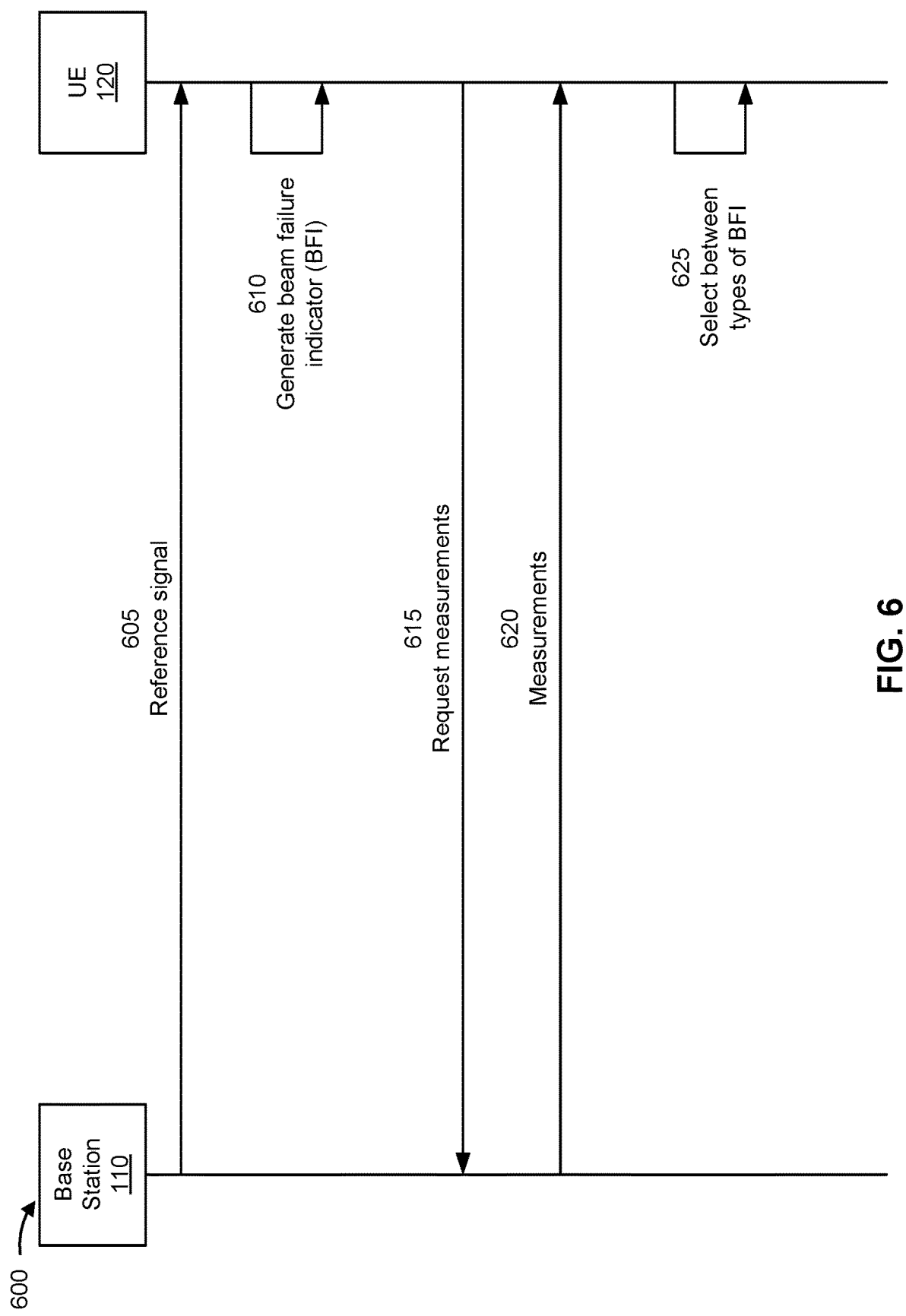
FIGS. 6 and 7 are diagrams illustrating examples associated with generating different beam failure indicators (BFIs) for noise or for interference, in accordance with the present disclosure.

FIG. 6 is a diagram illustrating an example 600 associated with configuring and using reference signal resource sets for subband measurements, in accordance with the present disclosure. As shown in FIG. 6, a base station 110 and a UE 120 may communicate with one another. In some aspects, the base station 110 and the UE 120 may be included in a wireless network, such as wireless network 100 of FIG. 1.

As shown in connection with reference number 605, the base station 110 may transmit, and the UE 120 may receive, at least one reference signal associated with at least one beam. In some aspects, the at least one reference signal may include a CSI-RS, an SSB, and/or another reference signal. The base station 110 may generate the at least one beam using beamforming hardware (e.g., as described above in connection with FIG. 3). Additionally, the UE 120 may use beamforming hardware (e.g., as described above in connection with FIG. 3) to apply a reception filter associated with the at least one beam.

Accordingly, the UE 120 may measure the at least one reference signal. For example, the UE 120 may determine one or more L1 measurements (e.g., an RSRP, a SINR, and/or another L1 measurement) and/or one or more derived measurements (e.g., a BLER and/or another measurement derived from at least one L1 measurement).

As shown in connection with reference number 610, the UE 120 may generate a BFI based at least in part on one or more measurements of the at least one reference signal at the UE 120. In some aspects, the measurement(s), of the at least one reference signal at the UE 120, may include a SINR, a BLER, or a combination thereof.

The UE 120 may generate the BFI based at least in part on the measurement(s), of the at least one reference signal at the UE 120, satisfying a first threshold. For example, the UE 120 may generate the BFI when a SINR associated with the at least one reference signal at the UE 120 is less than a SINR threshold. In another example, the UE 120 may generate the BFI when a BLER associated with the at least one reference signal at the UE 120 is less than a BLER threshold.

In some aspects, the base station 110 may transmit, and the UE 120 may receive, an indication of the first threshold. The base station 110 may include the indication in an RRC message, a MAC control element (MAC-CE), DCI, or a combination thereof. For example, the base station 110 may configure a plurality of first thresholds using an RRC message and activate one of the plurality of first thresholds using a MAC-CE and/or DCI. In another example, the base station 110 may configure an initial first threshold using an RRC message and then indicate a modification to the initial first threshold using a MAC-CE and/or DCI. Additionally, or alternatively, the UE 120 may determine the first threshold based at least in part on one or more rules stored in a memory of the UE 120. For example, the UE 120 may select the first threshold based at least in part on a table and/or other rule (e.g., as defined in 3GPP specifications and/or another standard) that accepts one or more properties (e.g., frequency, Doppler shift, MCS scheme, and/or another physical and/or logical property) associated with the at least one beam as input and outputs the first threshold. In another example, the base station 110 may indicate (e.g., via RRC message, MAC-CE, and/or DCI) selection of a first threshold from a plurality of first thresholds defined according to the rule(s).

As shown in connection with reference number 615, the UE 120 may transmit, and the base station 110 may receive, a request for one or more measurements associated with the at least one beam at the base station 110. For example, the UE 120 may transmit the request based at least in part on generating the BFI. In some aspects, the request may be included in an RRC message, a MAC-CE, UCI, or a combination thereof.

As shown in connection with reference number 620, the base station 110 may transmit, and the UE 120 may receive, the measurement(s) associated with the at least one beam at the base station 110, based at least in part on the request. In some aspects, the measurement(s), associated with the at least one beam at the base station, are based at least in part on a DMRS associated with the request. Additionally, or alternatively, the UE 120 may transmit, and the base station 110 may receive, one or more SRSs, such that the measurement(s), associated with the at least one beam at the base station, are based at least in part on the SRS(s).

Accordingly, the base station 110 may measure at least one signal from the UE 120 (e.g., the DMRS, the SRS, and/or another signal from the UE 120, as described above). The UE 120 may transmit the at least one signal using the at least one beam. For example, the UE 120 may generate the at least one beam using beamforming hardware (e.g., as described above in connection with FIG. 3). The base station 110 may determine one or more L1 measurements (e.g., an RSRP, a SINR, and/or another L1 measurement) and/or one or more derived measurements (e.g., a BLER and/or another measurement derived from at least one L1 measurement). Thus, the measurement(s), associated with the at least one beam at the base station 110, may include a SINR, a BLER, or a combination thereof.

As shown in connection with reference number 625, the UE 120 may select from two or more types of BFI based at least in part on the measurement(s) associated with the at least one beam at the base station 110. In some aspects, the two or more types of BFI may include a first type associated with noise and a second type associated with interference (e.g., as described above in connection with FIG. 5). The UE 120 may select the first type based at least in part on the measurement(s), associated with the at least one beam at the base station 110, satisfying a second threshold, and the UE 120 may select the second type based at least in part on the measurement(s), associated with the at least one beam at the base station 110, not satisfying the second threshold. For example, the UE 120 may select the first type of BFI when a SINR associated with the at least one beam at the base station 110 is less than a SINR threshold and/or a BLER associated with the at least one beam at the base station 110 is less than a BLER threshold. Similarly, the UE 120 may select the second type of BFI when a SINR associated with the at least one beam at the base station 110 is greater than a SINR threshold and/or a BLER associated with the at least one beam at the base station 110 is greater than a BLER threshold. Although described above in connection with two types of BFI, the description similarly applies to additional types of BFI (e.g., three types, four types, and so on).

In some aspects, the base station 110 may transmit, and the UE 120 may receive, an indication of the second threshold. The base station 110 may include the indication in an RRC message, a MAC-CE, DCI, or a combination thereof. For example, the base station 110 may configure a plurality of second thresholds using an RRC message and activate one of the plurality of second thresholds using a MAC-CE and/or DCI. In another example, the base station 110 may configure an initial second threshold using an RRC message and then indicate a modification to the initial second threshold using a MAC-CE and/or DCI. Additionally, or alternatively, the UE 120 may determine the second threshold based at least in part on one or more rules stored in a memory of the UE 120. For example, the UE 120 may select the second threshold based at least in part on a table and/or other rule (e.g., as defined in 3GPP specifications and/or another standard) that accepts one or more properties (e.g., frequency, Doppler shift, MCS scheme, and/or another physical and/or logical property) associated with the at least one beam as input and outputs the second threshold. In another example, the base station 110 may indicate (e.g., via RRC message, MAC-CE, and/or DCI) selection of a second threshold from a plurality of second thresholds defined according to the rule(s).

In some aspects, the UE 120 may further transmit the BFI from a lower layer of the UE 120 (e.g., a PHY layer and/or another lower layer) to a higher layer of the UE 120 (e.g., MAC layer 380 as described above in connection with FIG. 3 and/or another higher layer). Accordingly, in some aspects, the higher layer may perform BFR based at least in part on the BFI. In some aspects, the BFR procedure may be different for the first type of BFI as compared with the second type of BFI. Additionally, or alternatively, in some aspects, the higher layer may perform BFR based at least in part on receiving a quantity of BFIs that satisfy a quantity threshold. Accordingly, the higher layer may use a different quantity threshold for BFIs of the first type as compared with a quantity threshold for BFIs of the second type.

By using techniques as described in connection with FIG. 6, the UE 120 may distinguish between different types of BFI. For example, the UE 120 may distinguish BFI that is a result of noise from BFI that is result of interference (e.g., as described above in connection with FIG. 5). Accordingly, the UE 120 may use a higher threshold to trigger BFR for BFIs associated with interference, as compared with BFIs associated with noise, because local interference is more likely to be temporary. Additionally, or alternatively, the UE 120 may adjust an MCS scheme, a transmit power, and/or another property of transmissions when detecting BFI associated with interference, rather than selecting a different beam to use in communicating with the base station 110 as is performed when detecting BFI associated with noise, because interference affects the UE 120 locally while noise affects the whole channel between the UE 120 and the base station 110. As a result, the UE 120 conserves network overhead, processing resources, and battery power by reducing a likelihood of re-establishing an RRC connection, a RACH, and/or other channels between the UE 120 and the base station 110 when local interference is causing a temporary reduction in communication quality, communication reliability, and/or signal strength.

As indicated above, FIG. 6 is provided as an example. Other examples may differ from what is described with respect to FIG. 6.

Figure 7:
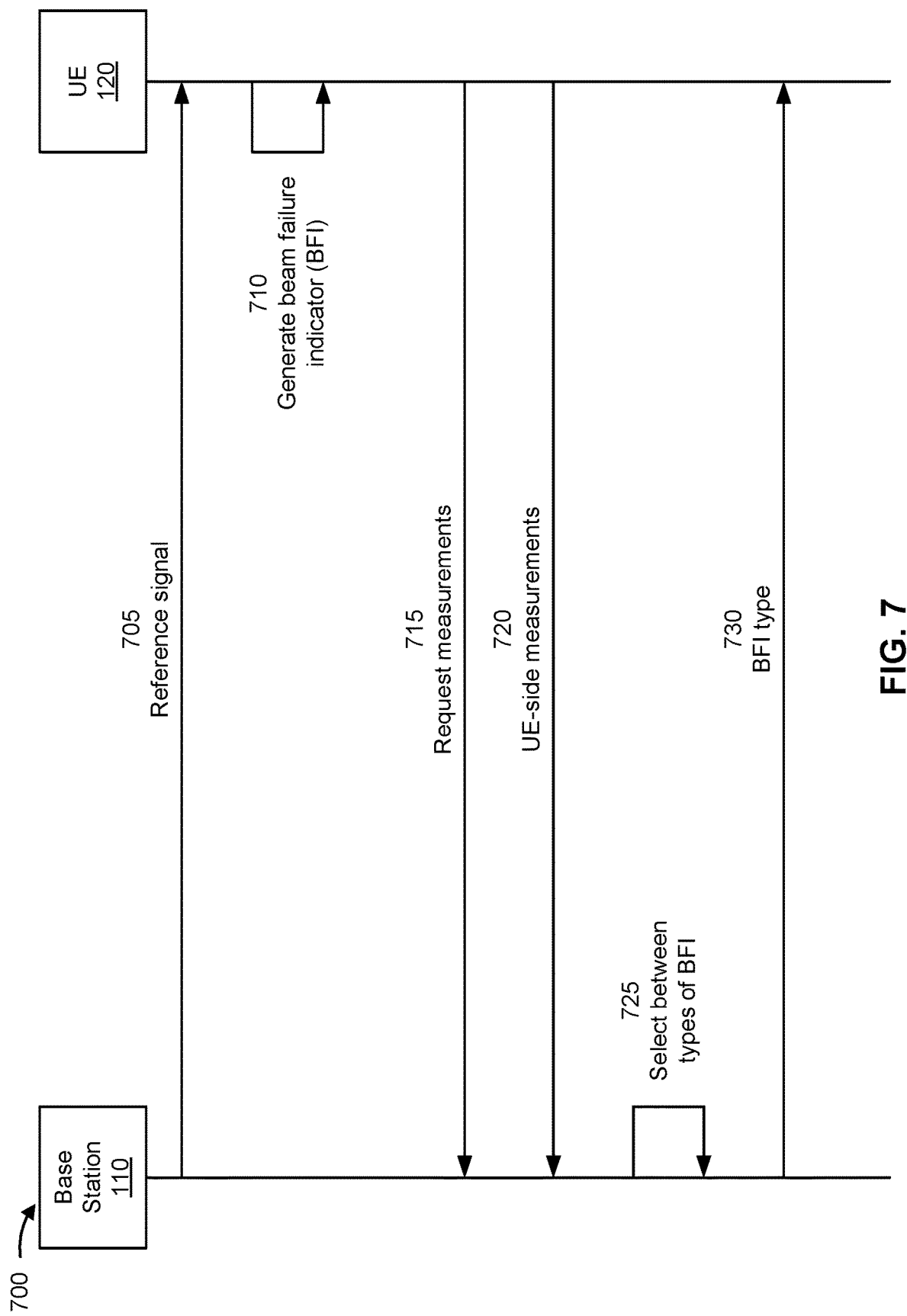

FIG. 7 is a diagram illustrating an example 700 associated with configuring and using reference signal resource sets for subband measurements, in accordance with the present disclosure. As shown in FIG. 7, a base station 110 and a UE 120 may communicate with one another. In some aspects, the base station 110 and the UE 120 may be included in a wireless network, such as wireless network 100 of FIG. 1.

As shown in connection with reference number 705, the base station 110 may transmit, and the UE 120 may receive, at least one reference signal associated with at least one beam. In some aspects, the UE 120 may receive (and measure) the at least one reference signal as described above in connection with reference number 605 of FIG. 6.

As shown in connection with reference number 710, the UE 120 may generate a BFI based at least in part on one or more measurements of the at least one reference signal associated with the at least one beam. In some aspects, the UE 120 may generate the BFI as described above in connection with reference number 610 of FIG. 6.

As shown in connection with reference number 715, the UE 120 may transmit, and the base station 110 may receive, a request for one or more measurements of at least one signal from the UE 120. For example, the UE 120 may transmit the request based at least in part on generating the BFI. In some aspects, the request may be included in an RRC message, a MAC-CE, UCI, or a combination thereof.

In some aspects, the at least one signal from the UE 120 may include a DMRS associated with the request (and/or with a different message, such as the message described below in connection with reference number 720). Additionally, or alternatively, the UE 120 may transmit, and the base station 110 may receive, one or more SRSs, such that the at least one signal includes the SRS(s).

Accordingly, the base station 110 may measure the at least one signal from the UE 120 (e.g., the DMRS, the SRS, and/or another signal from the UE 120, as described above). The UE 120 may transmit the at least one signal using the at least one beam. For example, the UE 120 may generate the at least one beam using beamforming hardware (e.g., as described above in connection with FIG. 3). The base station 110 may determine one or more L1 measurements (e.g., an RSRP, a SINR, and/or another L1 measurement) and/or one or more derived measurements (e.g., a BLER and/or another measurement derived from at least one L1 measurement). Thus, the measurement(s), of the at least one signal from the UE 120, may include a SINR, a BLER, or a combination thereof.

Additionally, and as shown in connection with reference number 720, the UE 120 may transmit, and the base station 110 may receive, a message indicating the measurement(s) of the at least one reference signal associated with the at least one beam. For example, the UE 120 may transmit the message based at least in part on generating the BFI. In some aspects, the message may be included in an RRC message, a MAC-CE, UCI, or a combination thereof.

In some aspects, the message and the request, as described above in connection with reference number 715) may be included in a same transmission. As an alternative, the UE 120 may transmit the message separately from the request.

As shown in connection with reference number 725, the base station 110 may select from two or more types of BFI based at least in part on the measurement(s) of the at least one signal from the UE 120. In some aspects, the two or more types of BFI may include a first type associated with noise and a second type associated with interference (e.g., as described above in connection with FIG. 5). The base station 110 may select between the first type and the second type similarly to the selection described above in connection with reference number 625 of FIG. 6. Although described above in connection with two types of BFI, the description similarly applies to additional types of BFI (e.g., three types, four types, and so on).

As shown in connection with reference number 730, the base station 110 may transmit, and the UE 120 may receive, an indication of the selection of the BFI from the two or more types of BFI, based at least in part on the measurement(s) of the at least one reference signal at the UE 120. For example, the base station 110 may transmit the indication based at least in part on the request (e.g., as described above in connection with reference number 715). In some aspects, the indication may be included in an RRC message, a MAC-CE, DCI, or a combination thereof.

Accordingly, the UE 120 may transmit the BFI, selected from the two or more types of BFI by the base station 110, from a lower layer of the UE 120 (e.g., a PHY layer and/or another lower layer) to a higher layer of the UE 120 (e.g., MAC layer 380 as described above in connection with FIG. 3 and/or another higher layer). Accordingly, in some aspects, the higher layer may perform BFR based at least in part on the BFI. In some aspects, the BFR procedure may be different for the first type of BFI as compared with the second type of BFI. Additionally, or alternatively, in some aspects, the higher layer may perform BFR based at least in part on receiving a quantity of BFIs that satisfy a quantity threshold. Accordingly, the higher layer may use a different quantity threshold for BFIs of the first type as compared with a quantity threshold for BFIs of the second type.

By using techniques as described in connection with FIG. 7, the base station 110 may assist the UE 120 in distinguishing between different types of BFI. For example, the UE 120 may distinguish BFI that is a result of noise from BFI that is result of interference (e.g., as described above in connection with FIG. 5). Accordingly, the UE 120 may use a higher threshold to trigger BFR for BFIs associated with interference, as compared with BFIs associated with noise, because local interference is more likely to be temporary. Additionally, or alternatively, the UE 120 may adjust an MCS scheme, a transmit power, and/or another property of transmissions when detecting BFI associated with interference, rather than selecting a different beam to use in communicating with the base station 110 as is performed when detecting BFI associated with noise, because interference affects the UE 120 locally while noise affects the whole channel between the UE 120 and the base station 110. As a result, the UE 120 conserves network overhead, processing resources, and battery power by reducing a likelihood of re-establishing an RRC connection, a RACH, and/or other channels between the UE 120 and the base station 110 when local interference is causing a temporary reduction in communication quality, communication reliability, and/or signal strength.

As indicated above, FIG. 7 is provided as an example. Other examples may differ from what is described with respect to FIG. 7.

Figure 8:
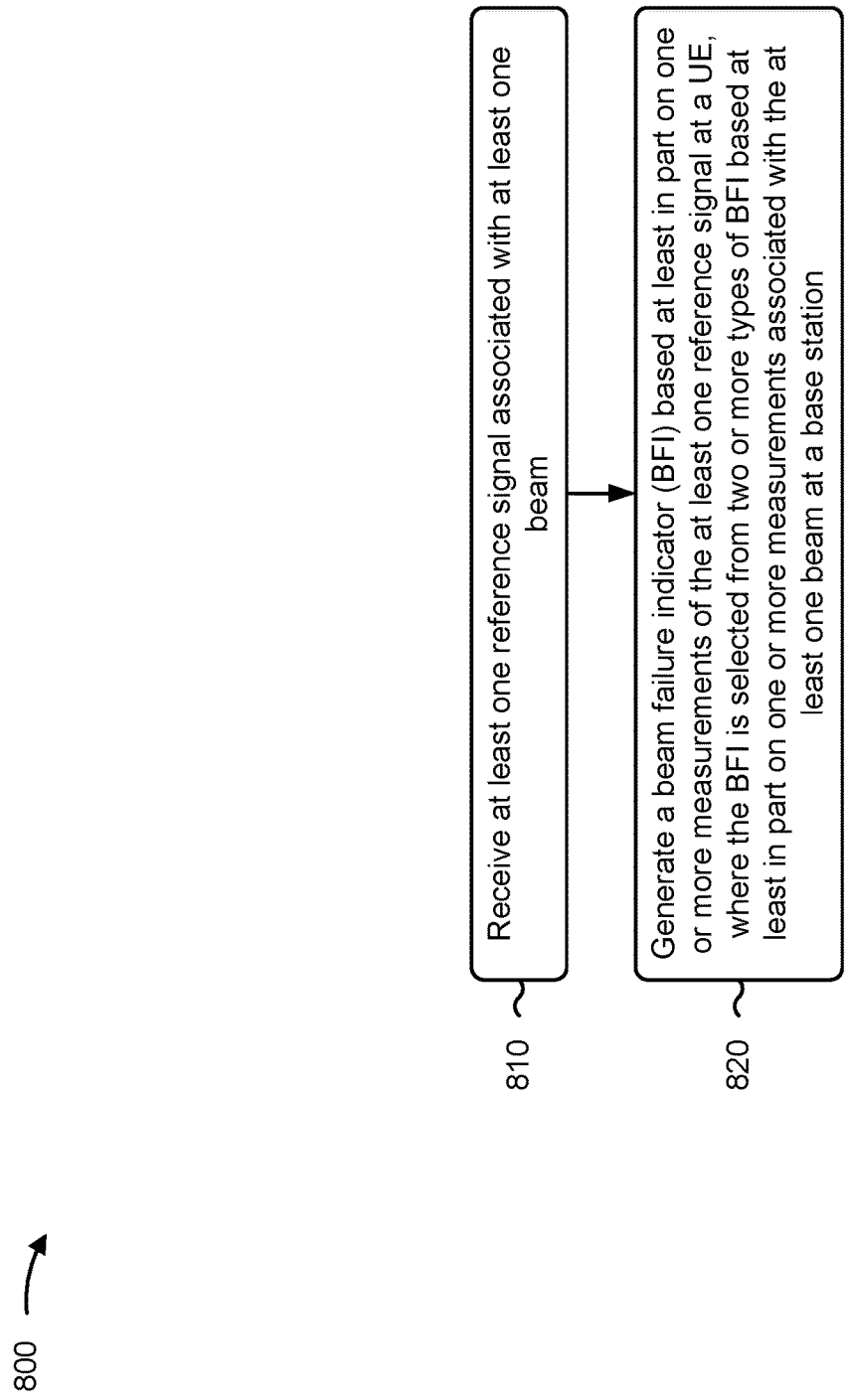
FIGS. 8 and 9 are diagrams illustrating example processes associated with generating different BFIs for noise or for interference, in accordance with the present disclosure.

FIG. 8 is a diagram illustrating an example process 800 performed, for example, by a UE, in accordance with the present disclosure. Example process 800 is an example where the UE (e.g., UE 120 and/or apparatus 1000 of FIG. 10) performs operations associated with selecting different BFIs for noise or interference.

As shown in FIG. 8, in some aspects, process 800 may include receiving, from a base station, at least one reference signal associated with at least one beam (block 810). For example, the UE (e.g., using reception component 1002, depicted in FIG. 10) may receive the at least one reference signal associated with the at least one beam, as described above.

As further shown in FIG. 8, in some aspects, process 800 may include generating a BFI based at least in part on one or more measurements of the at least one reference signal at the UE (block 820). For example, the UE (e.g., using generation component 1008, depicted in FIG. 10) may generate the BFI based at least in part on one or more measurements of the at least one reference signal at the UE, as described above. In some aspects, the BFI is selected from two or more types of BFI based at least in part on one or more measurements associated with the at least one beam at the base station.

Process 800 may include additional aspects, such as any single aspect or any combination of aspects described below and/or in connection with one or more other processes described elsewhere herein.

In a first aspect, the one or more measurements, of the at least one reference signal at the UE, include an SINR, a BLER, or a combination thereof.

In a second aspect, alone or in combination with the first aspect, the BFI is generated based at least in part on the one or more measurements, of the at least one reference signal at the UE, satisfying a threshold.

In a third aspect, alone or in combination with one or more of the first and second aspects, process 800 further includes receiving (e.g., using reception component 1002), from the base station, an indication of the threshold.

In a fourth aspect, alone or in combination with one or more of the first through third aspects, the indication is included in an RRC message.

In a fifth aspect, alone or in combination with one or more of the first through fourth aspects, the indication is included in DCI, a MAC-CE, or a combination thereof.

In a sixth aspect, alone or in combination with one or more of the first through fifth aspects, process 800 further includes transmitting (e.g., using transmission component 1004, depicted in FIG. 10), to the base station, a request for the one or more measurements associated with the at least one beam at the base station, and receiving (e.g., using reception component 1002), from the base station, the one or more measurements associated with the at least one beam at the base station, based at least in part on the request.

In a seventh aspect, alone or in combination with one or more of the first through sixth aspects, the request is included in UCI, a MAC-CE, or a combination thereof.

In an eighth aspect, alone or in combination with one or more of the first through seventh aspects, the one or more measurements, associated with the at least one beam at the base station, are based at least in part on a DMRS associated with the request.

In a ninth aspect, alone or in combination with one or more of the first through eighth aspects, process 800 further includes transmitting (e.g., using transmission component 1004), to the base station, one or more SRSs using the at least one beam, such that the one or more measurements, associated with the at least one beam at the base station, are based at least in part on the one or more SRSs.

In a tenth aspect, alone or in combination with one or more of the first through ninth aspects, process 800 further includes transmitting (e.g., using transmission component 1004), to the base station, a message indicating the one or more measurements of the at least one reference signal at the UE, and receiving (e.g., using reception component 1002), from the base station, an indication of a selection of the BFI from the two or more types of BFI, based at least in part on the one or more measurements of the at least one reference signal at the UE.

In an eleventh aspect, alone or in combination with one or more of the first through tenth aspects, the message is included in UCI, a MAC-CE, or a combination thereof.

In a twelfth aspect, alone or in combination with one or more of the first through eleventh aspects, the one or more measurements, associated with the at least one beam at the base station, are based at least in part on a DMRS associated with the message.

In a thirteenth aspect, alone or in combination with one or more of the first through twelfth aspects, the two or more types of BFI include a first type associated with noise and a second type associated with interference.

In a fourteenth aspect, alone or in combination with one or more of the first through thirteenth aspects, the first type is selected based at least in part on the one or more measurements, associated with the at least one beam at the base station, satisfying a threshold, and the second type is selected based at least in part on the one or more measurements, associated with the at least one beam at the base station, not satisfying the threshold.

In a fifteenth aspect, alone or in combination with one or more of the first through fourteenth aspects, the one or more measurements, associated with the at least one beam at the base station, include an SINR, a BLER, or a combination thereof.

In a sixteenth aspect, alone or in combination with one or more of the first through fifteenth aspects, process 800 further includes transmitting (e.g., using bus component 1010) the BFI from a lower layer of the UE to a higher layer of the UE.

In a seventeenth aspect, alone or in combination with one or more of the first through sixteenth aspects, the higher layer performs BFR based at least in part on the BFI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
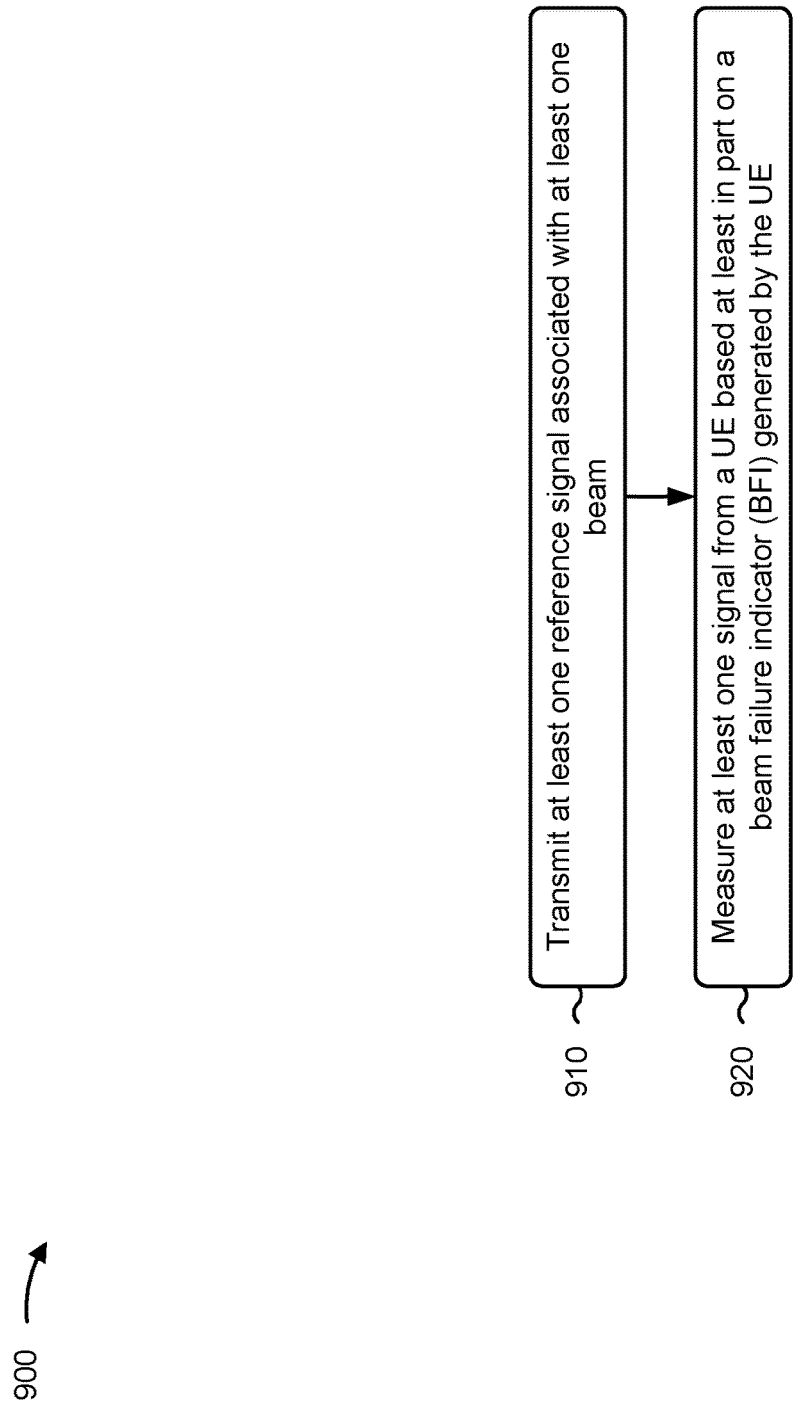

FIG. 9 is a diagram illustrating an example process 900 performed, for example, by a base station, in accordance with the present disclosure. Example process 900 is an example where the base station (e.g., base station 110 and/or apparatus 1100 of FIG. 11) performs operations associated with selecting different BFIs for noise or interference.

As shown in FIG. 9, in some aspects, process 900 may include transmitting, to a UE (e.g., UE 120 and/or apparatus 1000 of FIG. 10), at least one reference signal associated with at least one beam (block 910). For example, the base station (e.g., using transmission component 1104, depicted in FIG. 11) may transmit the at least one reference signal associated with the at least one beam, as described above.

As further shown in FIG. 9, in some aspects, process 900 may include measuring at least one signal from the UE based at least in part on a BFI generated by the UE (block 920). For example, the base station (e.g., using measurement component 1108, depicted in FIG. 11) may measure the at least one signal from the UE based at least in part on the BFI generated by the UE, as described above.

Process 900 may include additional aspects, such as any single aspect or any combination of aspects described below and/or in connection with one or more other processes described elsewhere herein.

In a first aspect, measuring the at least one signal from the UE comprises determining an SINR, a BLER, or a combination thereof.

In a second aspect, alone or in combination with the first aspect, process 900 further includes transmitting (e.g., using transmission component 1104), to the UE, an indication of a threshold, where the BFI was generated based at least in part on the threshold.

In a third aspect, alone or in combination with one or more of the first and second aspects, the indication is included in an RRC message.

In a fourth aspect, alone or in combination with one or more of the first through third aspects, the indication is included in DCI, a MAC-CE, or a combination thereof.

In a fifth aspect, alone or in combination with one or more of the first through fourth aspects, process 900 further includes receiving (e.g., using reception component 1102, depicted in FIG. 11), from the UE, a request for one or more measurements of the at least one signal from the UE, and transmitting (e.g., using transmission component 1104), to the UE, the one or more measurements of the at least one signal from the UE, based at least in part on the request.

In a sixth aspect, alone or in combination with one or more of the first through fifth aspects, the request is included in UCI, a MAC-CE, or a combination thereof.

In a seventh aspect, alone or in combination with one or more of the first through sixth aspects, the at least one signal from the UE includes a DMRS associated with the request.

In an eighth aspect, alone or in combination with one or more of the first through seventh aspects, process 900 further includes receiving (e.g., using reception component 1102), from the UE, one or more SRSs using the at least one beam, such that the at least one signal from the UE includes the one or more SRSs.

In a ninth aspect, alone or in combination with one or more of the first through eighth aspects, process 900 further includes receiving (e.g., using reception component 1102), from the UE, a message indicating one or more measurements of the at least one reference signal associated with the at least one beam, and transmitting (e.g., using transmission component 1104), to the UE, an indication of a selection for the BFI from two or more types of BFI, based at least in part on measuring the at least one signal from the UE.

In a tenth aspect, alone or in combination with one or more of the first through ninth aspects, the message is included in UCI, a MAC-CE, or a combination thereof.

In an eleventh aspect, alone or in combination with one or more of the first through tenth aspects, the at least one signal from the UE includes a DMRS associated with the message.

In a twelfth aspect, alone or in combination with one or more of the first through eleventh aspects, the two or more types of BFI include a first type associated with noise and a second type associated with interference.

In a thirteenth aspect, alone or in combination with one or more of the first through twelfth aspects, the first type is selected based at least in part on one or more measurements of the at least one signal from the UE satisfying a threshold, and the second type is selected based at least in part on the one or more measurements of the at least one signal from the UE not satisfying the threshold.

In a fourteenth aspect, alone or in combination with one or more of the first through thirteenth aspects, the one or more measurements, of the at least one reference signal associated with the at least one beam, include an SINR, a BLER, or a combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
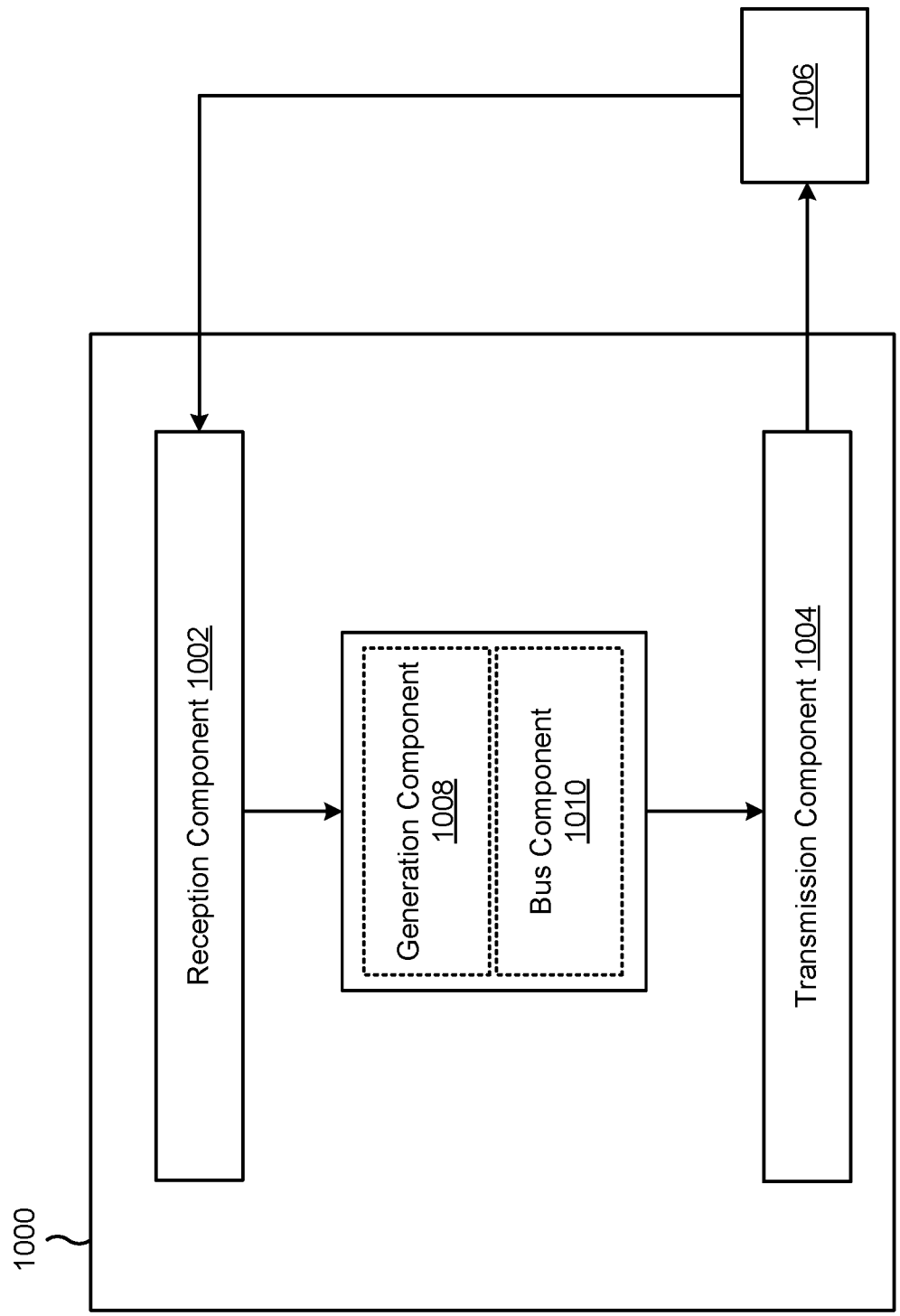
FIGS. 10 and 11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a generation component 1008 or a bus component 1010, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

In some aspects, the reception component 1002 may receive, from the apparatus 1006, at least one reference signal associated with at least one beam. Accordingly, the generation component 1008 may generate a BFI based at least in part on one or more measurements of the at least one reference signal at the apparatus 1000. In some aspects, the generation component 1008 may include one or more antennas, a demodulator, a MIMO detector, a receive processor, a controller/processor, a memory, or a combination thereof, of the UE described above in connection with FIG. 2. The generation component 1008 may select the BFI from two or more types of BFI based at least in part on one or more measurements associated with the at least one beam at the apparatus 1006.

In some aspects, the generation component 1008 may generate the BFI based at least in part on the one or more measurements of the at least one reference signal at the apparatus 1000 satisfying a threshold. The reception component 1002 may receive, from the apparatus 1006, an indication of the threshold.

In some aspects, the transmission component 1004 may transmit, to the apparatus 1006, a request for the one or more measurements associated with the at least one beam at the apparatus 1006. Accordingly, the reception component 1002 may receive, from the apparatus 1006, the one or more measurements associated with the at least one beam at the apparatus 1006, based at least in part on the request.

As an alternative, the transmission component 1004 may transmit, to the apparatus 1006, a message indicating the one or more measurements of the at least one reference signal at the apparatus 1000. Accordingly, the reception component 1002 may receive, from the apparatus 1006, an indication of a selection of the BFI from the two or more types of BFI, based at least in part on the one or more measurements of the at least one reference signal at the apparatus 1000.

In any of the aspects described above, the transmission component 1004 may transmit, to the apparatus 1006, one or more SRSs using the at least one beam. Accordingly, the one or more measurements, associated with the at least one beam at the apparatus 1006, may be based at least in part on the one or more SRSs.

In any of the aspects described above, the bus component 1010 may transmit the BFI from a lower layer of the apparatus 1000 to a higher layer of the apparatus 1000. In some aspects, the bus component 1010 may include a MIMO detector, a receive processor, a controller/processor, a memory, or a combination thereof, of the UE described above in connection with FIG. 2, and/or a wired connection between components of the UE described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
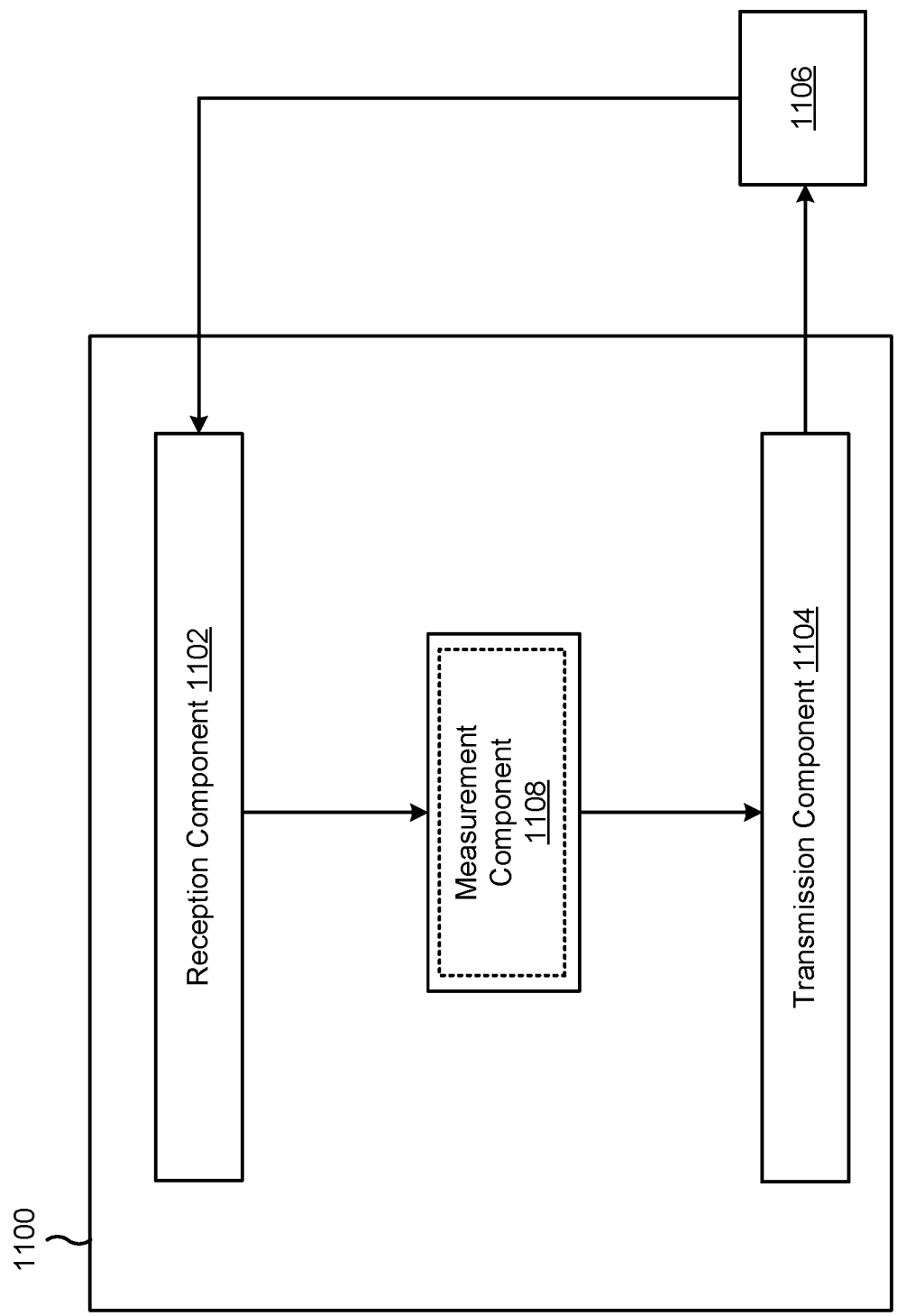

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a measurement component 1108, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

In some aspects, the transmission component 1104 may transmit, to the apparatus 1106, at least one reference signal associated with at least one beam. Moreover, the measurement component 1108 may measure at least one signal from the apparatus 1106 based at least in part on a BFI generated by the apparatus 1106.

In some aspects, the apparatus 1106 may generate the BFI based at least in part on one or more measurements of the at least one reference signal associated with the at least one beam satisfying a threshold. The transmission component 1104 may transmit, to the apparatus 1106, an indication of the threshold.

In some aspects, the reception component 1102 may receive, from the apparatus 1106, a request for one or more measurements of the at least one signal from the apparatus 1106. Accordingly, the transmission component 1104 may transmit, to the apparatus 1106, the one or more measurements of the at least one signal from the UE, based at least in part on the request.

As an alternative, the reception component 1102 may receive, from the apparatus 1106, a message indicating the one or more measurements of the at least one reference signal associated with the at least one beam. Accordingly, the transmission component 1104 may transmit, to the apparatus 1106, an indication of a selection for the BFI from two or more types of BFI, based at least in part on the measurement component 1108 measuring the at least one signal from the apparatus 1106.

In any of the aspects described above, the reception component 1102 may receive, from the apparatus 1106, one or more SRSs using the at least one beam, such that the at least one signal from the apparatus 1106 includes the one or more SRSs.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, at least one reference signal associated with at least one beam; and generating a beam failure indicator (BFI) based at least in part on one or more measurements of the at least one reference signal at the UE, wherein the BFI is selected from two or more types of BFI based at least in part on one or more measurements associated with the at least one beam at the base station.

Aspect 2: The method of Aspect 1, wherein the one or more measurements, of the at least one reference signal at the UE, include a signal-to-interference-and-noise ratio, a block error rate, or a combination thereof.

Aspect 3: The method of any one of Aspects 1 through 2, wherein the BFI is generated based at least in part on the one or more measurements, of the at least one reference signal at the UE, satisfying a threshold.

Aspect 4: The method of Aspect 3, further comprising: receiving, from the base station, an indication of the threshold.

Aspect 5: The method of Aspect 4, wherein the indication is included in a radio resource control message.

Aspect 6: The method of any one of Aspects 4 through 5, wherein the indication is included in downlink control information, a medium access control layer control element, or a combination thereof.

Aspect 7: The method of any one of Aspects 1 through 6, further comprising: transmitting, to the base station, a request for the one or more measurements associated with the at least one beam at the base station; and receiving, from the base station, the one or more measurements associated with the at least one beam at the base station, based at least in part on the request.

Aspect 8: The method of Aspect 7, wherein the request is included in uplink control information, a medium access control layer control element, or a combination thereof.

Aspect 9: The method of any one of Aspects 7 through 8, wherein the one or more measurements, associated with the at least one beam at the base station, are based at least in part on a demodulation reference signal associated with the request.

Aspect 10: The method of any one of Aspects 1 through 6, further comprising: transmitting, to the base station, a message indicating the one or more measurements of the at least one reference signal at the UE; and receiving, from the base station, an indication of a selection of the BFI from the two or more types of BFI, based at least in part on the one or more measurements of the at least one reference signal at the UE.

Aspect 11: The method of Aspect 10, wherein the message is included in uplink control information, a medium access control layer control element, or a combination thereof.

Aspect 12: The method of any one of Aspects 10 through 11, wherein the one or more measurements, associated with the at least one beam at the base station, are based at least in part on a demodulation reference signal associated with the message.

Aspect 13: The method of any one of Aspects 1 through 12, further comprising: transmitting, to the base station, one or more sounding reference signals (SRSs) using the at least one beam, wherein the one or more measurements, associated with the at least one beam at the base station, are based at least in part on the one or more SRSs.

Aspect 14: The method of any one of Aspects 1 through 13, wherein the two or more types of BFI include a first type associated with noise and a second type associated with interference.

Aspect 15: The method of Aspect 14, wherein the first type is selected based at least in part on the one or more measurements, associated with the at least one beam at the base station, satisfying a threshold, and the second type is selected based at least in part on the one or more measurements, associated with the at least one beam at the base station, not satisfying the threshold.

Aspect 16: The method of any one of Aspects 1 through 15, wherein the one or more measurements, associated with the at least one beam at the base station, include a signal-to-interference-and-noise ratio, a block error rate, or a combination thereof.

Aspect 17: The method of any one of Aspects 1 through 16, further comprising: transmitting the BFI from a lower layer of the UE to a higher layer of the UE.

Aspect 18: The method of Aspect 17, wherein the higher layer performs beam failure recovery (BFR) based at least in part on the BFI.

Aspect 19: A method of wireless communication performed by a base station, comprising: transmitting, to a user equipment (UE), at least one reference signal associated with at least one beam; and measuring at least one signal from the UE based at least in part on a beam failure indicator (BFI) generated by the UE.

Aspect 20: The method of Aspect 19, wherein measuring the at least one signal from the UE comprises determining a signal-to-interference-and-noise ratio, a block error rate, or a combination thereof.

Aspect 21: The method of any one of Aspects 19 through 20, further comprising: transmitting, to the UE, an indication of a threshold, wherein the BFI was generated based at least in part on the threshold.

Aspect 22: The method of Aspect 21, wherein the indication is included in a radio resource control message.

Aspect 23: The method of any one of Aspects 21 through 22, wherein the indication is included in downlink control information, a medium access control layer control element, or a combination thereof.

Aspect 24: The method of any one of Aspects 19 through 23, further comprising: receiving, from the UE, a request for one or more measurements of the at least one signal from the UE; and transmitting, to the UE, the one or more measurements of the at least one signal from the UE, based at least in part on the request.

Aspect 25: The method of Aspect 24, wherein the request is included in uplink control information, a medium access control layer control element, or a combination thereof.

Aspect 26: The method of any one of Aspects 24 through 25, wherein the at least one signal from the UE includes a demodulation reference signal associated with the request.

Aspect 27: The method of any one of Aspects 19 through 23, further comprising: receiving, from the UE, a message indicating one or more measurements of the at least one reference signal associated with the at least one beam; and transmitting, to the UE, an indication of a selection for the BFI from two or more types of BFI, based at least in part on measuring the at least one signal from the UE.

Aspect 28: The method of Aspect 27, wherein the message is included in uplink control information, a medium access control layer control element, or a combination thereof.

Aspect 29: The method of any one of Aspects 27 through 28, wherein the at least one signal from the UE includes a demodulation reference signal associated with the message.

Aspect 30: The method of any one of Aspects 27 through 29, wherein the two or more types of BFI include a first type associated with noise and a second type associated with interference.

Aspect 31: The method of Aspect 30, wherein the first type is selected based at least in part on one or more measurements of the at least one signal from the UE satisfying a threshold, and the second type is selected based at least in part on the one or more measurements of the at least one signal from the UE not satisfying the threshold.

Aspect 32: The method of any one of Aspects 19 through 31, further comprising: receiving, from the UE, one or more sounding reference signals (SRSs) using the at least one beam, wherein the at least one signal from the UE includes the one or more SRSs.

Aspect 33: The method of any one of Aspects 19 through 32, wherein the one or more measurements, of the at least one reference signal associated with the at least one beam, include a signal-to-interference-and-noise ratio, a block error rate, or a combination thereof.

Aspect 34: An apparatus for wireless communication at a device, comprising a processor; memory coupled with the processor; and instructions stored in the memory and executable by the processor to cause the apparatus to perform the method of one or more Aspects of Aspects 1-18.

Aspect 35: A device for wireless communication, comprising a memory and one or more processors coupled to the memory, the memory and the one or more processors configured to perform the method of one or more Aspects of Aspects 1-18.

Aspect 36: An apparatus for wireless communication, comprising at least one means for performing the method of one or more Aspects of Aspects 1-18.

Aspect 37: A non-transitory computer-readable medium storing code for wireless communication, the code comprising instructions executable by a processor to perform the method of one or more Aspects of Aspects 1-18.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 1-18.

Aspect 39: An apparatus for wireless communication at a device, comprising a processor; memory coupled with the processor; and instructions stored in the memory and executable by the processor to cause the apparatus to perform the method of one or more Aspects of Aspects 19-33.

Aspect 40: A device for wireless communication, comprising a memory and one or more processors coupled to the memory, the memory and the one or more processors configured to perform the method of one or more Aspects of Aspects 19-33.

Aspect 41: An apparatus for wireless communication, comprising at least one means for performing the method of one or more Aspects of Aspects 19-33.

Aspect 42: A non-transitory computer-readable medium storing code for wireless communication, the code comprising instructions executable by a processor to perform the method of one or more Aspects of Aspects 19-33.

Aspect 43: A non-transitory computer-readable medium storing a set of instructions for wireless communication, the set of instructions comprising one or more instructions that, when executed by one or more processors of a device, cause the device to perform the method of one or more Aspects of Aspects 19-33.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to:
   receive, from a base station, at least one reference signal associated with at least one beam; and
   generate a beam failure indicator (BFI) in accordance with one or more measurements of the at least one reference signal at the UE, the BFI being selected, from two or more types of BFI, in accordance with one or more measurements associated with the at least one beam at the base station.

2. The UE of claim 1, wherein the one or more measurements, of the at least one reference signal at the UE, include a signal-to-interference-and-noise ratio, a block error rate, or a combination thereof.

3. The UE of claim 1, wherein the BFI is generated in accordance with the one or more measurements, of the at least one reference signal at the UE, satisfying a threshold.

4. The UE of claim 3, wherein the one or more processors are further configured to:
   receive, from the base station, an indication of the threshold.

5. The UE of claim 4, wherein the indication is included in a radio resource control message.

6. The UE of claim 4, wherein the indication is included in downlink control information, a medium access control layer control element, or a combination thereof.

7. The UE of claim 1, wherein the one or more processors are further configured to:
   transmit, to the base station, a request for the one or more measurements associated with the at least one beam at the base station; and
   receive, from the base station, the one or more measurements associated with the at least one beam at the base station, in accordance with the request.

8. The UE of claim 7, wherein the request is included in uplink control information, a medium access control layer control element, or a combination thereof.

9. The UE of claim 7, wherein the one or more measurements, associated with the at least one beam at the base station, correspond to a demodulation reference signal associated with the request.

10. The UE of claim 1, wherein the one or more processors are further configured to:
    transmit, to the base station, one or more sounding reference signals (SRSs) using the at least one beam,
    the one or more measurements, associated with the at least one beam at the base station, corresponding to the one or more SRSs.

11. The UE of claim 1, wherein the one or more processors are further configured to:
    transmit, to the base station, a message indicating the one or more measurements of the at least one reference signal at the UE; and
    receive, from the base station, an indication of a selection of the BFI from the two or more types of BFI, in accordance with the one or more measurements of the at least one reference signal at the UE.

12. The UE of claim 11, wherein the message is included in uplink control information, a medium access control layer control element, or a combination thereof.

13. The UE of claim 11, wherein the one or more measurements, associated with the at least one beam at the base station, correspond to a demodulation reference signal associated with the message.

14. The UE of claim 1, wherein the two or more types of BFI include a first type associated with noise and a second type associated with interference.

15. The UE of claim 14, wherein the first type is selected according to the one or more measurements, associated with the at least one beam at the base station, satisfying a threshold, and the second type is selected according to the one or more measurements, associated with the at least one beam at the base station, not satisfying the threshold.

16. The UE of claim 1, wherein the one or more measurements, associated with the at least one beam at the base station, include a signal-to-interference-and-noise ratio, a block error rate, or a combination thereof.

17. The UE of claim 1, wherein the one or more processors are further configured to:
   transmit the BFI from a lower layer of the UE to a higher layer of the UE.

18. The UE of claim 17, wherein the higher layer performs beam failure recovery (BFR) in accordance with the BFI.

19. A base station for wireless communication, comprising:
   a memory; and
   one or more processors coupled to the memory, the one or more processors configured to:
      transmit, to a user equipment (UE), at least one reference signal associated with at least one beam; and
      measure at least one signal received from the UE using the at least one beam, the at least one signal measured in accordance with a beam failure indicator (BFI) generated by the UE.

20. The base station of claim 19, wherein the one or more processors are further configured to:
   transmit, to the UE, an indication of a threshold,
   the BFI being associated with the threshold.

21. The base station of claim 19, wherein the one or more processors are further configured to:
   receive, from the UE, a request for one or more measurements of the at least one signal from the UE; and
   transmit, to the UE, the one or more measurements of the at least one signal from the UE, in accordance with the request.

22. The base station of claim 21, wherein the at least one signal from the UE includes a demodulation reference signal associated with the request.

23. The base station of claim 19, wherein the one or more processors are further configured to:
   receive, from the UE, one or more sounding reference signals (SRSs) using the at least one beam,
   the at least one signal from the UE including the one or more SRSs.

24. The base station of claim 19, wherein the one or more processors are further configured to:
   receive, from the UE, a message indicating one or more measurements of the at least one reference signal associated with the at least one beam; and
   transmit, to the UE, an indication of a selection for the BFI from two or more types of BFI, responsive to measuring the at least one signal from the UE.

25. The base station of claim 24, wherein the at least one signal from the UE includes a demodulation reference signal associated with the message.

26. The base station of claim 24, wherein the two or more types of BFI include a first type associated with noise and a second type associated with interference, the first type is selected according to one or more measurements of the at least one signal from the UE satisfying a threshold, and the second type is selected according to the one or more measurements of the at least one signal from the UE not satisfying the threshold.

27. A method of wireless communication performed by a user equipment (UE), comprising:
   receiving, from a base station, at least one reference signal associated with at least one beam; and
   generating a beam failure indicator (BFI) in accordance with one or more measurements of the at least one reference signal at the UE, the BFI being selected, from two or more types of BFI, in accordance with one or more measurements associated with the at least one beam at the base station.

28. The method of claim 27, further comprising:
   transmitting, to the base station, a request for the one or more measurements associated with the at least one beam at the base station; and
   receiving, from the base station, the one or more measurements associated with the at least one beam at the base station, in accordance with the request.

29. The method of claim 27, further comprising:
   transmitting, to the base station, a message indicating the one or more measurements of the at least one reference signal at the UE; and
   receiving, from the base station, an indication of a selection of the BFI from the two or more types of BFI, in accordance with the one or more measurements of the at least one reference signal at the UE.

30. A method of wireless communication performed by a base station, comprising:
   transmitting, to a user equipment (UE), at least one reference signal associated with at least one beam; and
   measuring at least one signal received from the UE using the at least one beam, the at least one signal measured in accordance with a beam failure indicator (BFI) generated by the UE.

* * * * *